US007242903B2

(12) United States Patent
Steel et al.

(10) Patent No.: US 7,242,903 B2
(45) Date of Patent: Jul. 10, 2007

(54) DIGITAL RECEIVER WITH AURAL INTERFACE

(75) Inventors: Adrian Martin Steel, Yateley (GB); Frank Tucker, Eastbourne (GB)

(73) Assignee: Matsushita Electric Industrial Co., Ltd., Osaka (JP)

( * ) Notice: Subject to any disclaimer, the term of this patent is extended or adjusted under 35 U.S.C. 154(b) by 347 days.

(21) Appl. No.: 10/813,428

(22) Filed: Mar. 31, 2004

(65) Prior Publication Data

US 2004/0259520 A1 Dec. 23, 2004

(30) Foreign Application Priority Data

Mar. 31, 2003 (GB) ................................ 0307451.5

(51) Int. Cl.
*H04H 1/00* (2006.01)
*H04Q 7/22* (2006.01)

(52) U.S. Cl. .................. 455/3.04; 455/3.01; 455/412.1

(58) Field of Classification Search ................ 455/130, 455/3.01, 3.04, 3.06, 412.1, 412.2, 61, 70, 455/154.2, 151.1, 419; 375/340, 141, 260
See application file for complete search history.

(56) References Cited

U.S. PATENT DOCUMENTS

| | | | | |
|---|---|---|---|---|
| 5,793,980 | A * | 8/1998 | Glaser et al. | 709/231 |
| 6,128,334 | A * | 10/2000 | Dapper et al. | 375/216 |
| 6,151,634 | A * | 11/2000 | Glaser et al. | 709/236 |
| 6,678,215 | B1 * | 1/2004 | Treyz et al. | 368/10 |
| 6,901,207 | B1 * | 5/2005 | Watkins | 386/83 |
| 2002/0095228 | A1 * | 7/2002 | Corts et al. | 700/94 |
| 2002/0114613 | A1 | 8/2002 | Thai | |
| 2003/0032415 | A1 | 2/2003 | Cho et al. | |
| 2003/0038893 | A1 | 2/2003 | Rajamaki et al. | |

FOREIGN PATENT DOCUMENTS

| | | |
|---|---|---|
| EP | 0 687 114 A2 | 12/1995 |
| WO | WO 95/19668 | 7/1995 |
| WO | WO 99/63754 | 12/1999 |

OTHER PUBLICATIONS

British Search Report issued in Great Britain Patent Applicaiton No. 0307451.5 on Oct. 10, 2003.

* cited by examiner

*Primary Examiner*—Sonny Trinh
(74) *Attorney, Agent, or Firm*—McDermott Will & Emery LLP

(57) ABSTRACT

A digital audio receiver particularly beneficial to the sight-impaired and controlled by the broadcaster has means for separating and storing audio clips transmitted by the broadcaster to be reproduced either in response to user operations (e.g. "volume up", "Radio 4 selected") or in response to a subsequent broadcast signal identifying a clip to be played.

11 Claims, 1 Drawing Sheet

*FIGURE*
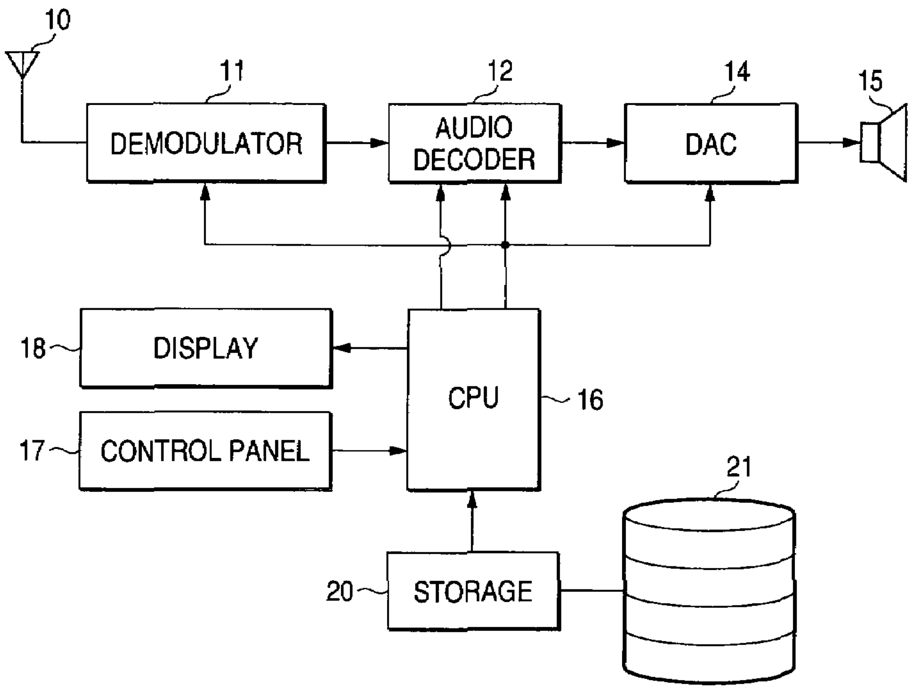

DIGITAL RECEIVER WITH AURAL INTERFACE

The present invention relates to an aural interface system for use with digital receivers such as digital radio receivers.

Users of digital radios rely on visual and physical interfaces to know what services and/or content is available or the results of operating the controls. Additionally, there is another increasing range of data services available to digital receiving equipment Most receivers will display user options using a visual method incorporating an LCD or graphical display and require the user to press buttons, manipulate a cursor or use some other user input method relating to the graphical data in order to control the receiver functions. A disadvantage of this arrangement is that it is not convenient for visually impaired users who are potentially the major benefactors of new data services and advanced digital broadcast facilities. For receivers in vehicles this can present a serious distraction to drivers.

It is known to provide set top boxes with an audio output facility whereby visually impaired users can use the facilities offered by the set top box, for example to navigate their way through an electronic on-screen program guide. An example is shown in WO-A-99/63754. Here it is suggested that the user might download new audio clips from an external server. Also, it is known to provide DVDs with audio navigation which allows visually impaired users to access all of the DVD's features.

The present invention proposes to enhance these facilities by storing in the receiver brief audio sound clips, and enabling broadcasters to have a degree of control over the content of such sound clips. The clips may include clips relating to the normal operation of the receivers apparatus as well as content information relating to the broadcast.

The invention provides a digital audio receiver for receiving digital audio information in the form of live broadcast data transmitted simultaneously with additional audio data clips, the receiver comprising:

means for separating the live broadcast data from the additional audio clips, means for storing the additional audio clips, user operable means for selecting a specific program and controlling other functions of the receiver, audio output means; and control means for controlling the audio output means to reproduce a selected audio program in response to a signal from the user operable means and to reproduce one or more selected audio clips in response to further signals identifying the audio clips.

The invention may be implemented in several ways. Two are described below:

In a first implementation, one or more further signals identifying an audio clip may be broadcast to the receiver. The broadcaster could then send for storage frequently used audio clips such as "the shipping forecast now follows" without the need to broadcast them repeatedly. They could then be "broadcast" to listeners in response to a broadcast signal interpreted as "play shipping clip". The stored audio clips could even include frequently used advertisements.

In a second implementation, which could be used in addition to the first, signals identifying audio clips to be played are supplied by the user operable means. Here the clips would usually identify the function carried out by the user, as will be described in more detail below.

It should be noted that the tern "clip" is intended to identify any finite portion of audio information.

In order that the present invention be more readily understood, an embodiment thereof will now be described by way of example with reference to the accompanying drawings which shows a block diagrammatic representation of a digital radio receiver provided with an aural interface.

The preferred embodiment of the present invention is a digital radio receiver which is shown diagrammatically in FIG. 1. The receiver comprises an antenna 10 for receiving a digital audio broadcast The received signals are demodulated in a demodulator 11 and then input to an audio decoder circuit 12. This circuit is required because the received signals are in a compressed, coded form and need to be decompressed and decoded before being output to a digital to analog converter circuit 14 which sends appropriate signals to one or more speakers 15. The demodulator 11, audio decoder 12 and digital to analog converter 14 are all controlled by a central processing unit 16 which receives user specific inputs from a control panel 17 and also controls a display 18. Thus far, the digital radio receiver is conventional. However, such a radio receiver is not ideal for a visually impaired user in view of the fact that many of the controls may be confusingly similar to the touch and the displays are often relatively small LCD displays which are sometimes difficult to read in certain light conditions. The same disadvantages are felt by vehicle drivers. While a visually impaired user can often remember the location and function of the controls, there are situations where in fact the same physical controls can have their actual fiction altered by a menu system and the altered functions are in fact displayed on the display 18. In these circumstances, it is relatively easy for a visually impaired user to become confused.

The present embodiment is provided with a storage device 20 which stores a plurality of audio clips represented by a stack 21. When the user operates one of the controls on the control panel 17, this results in a request being sent to the CPU in order to achieve the desired function. The CPU then causes the desired function to occur but also causes the appropriate audio clip to be selected from the stack 21 and played to the user.

The audio clips can be pre-recorded and loaded in to the radio receiver during manufacture. However, the audio clips can be updated dynamically via the digital broadcast itself in order to make an audio clip highly recognizable. For example, when the station "Capital Radio" is selected, an audio clip containing the voice of a presenter from that radio station can be played identifying the fact that Capital Radio has been selected making the user experience more personalized.

It is also possible for well known personalities to record clips relating to standard functions such as a volume up/down or next service so that a user could select those audio clips provided by their radio station or personality to be used for these commands.

It will be appreciated that the audio clips can be in any one of a number of languages which can be selected freely by the user.

According to the invention, the broadcaster is allowed to load a set of audio clips into a radio receiver and then replay a specific one of these radio clips whenever an appropriate signal is transmitted by the broadcaster or in response to a specific command request by a user. For example, an electronic program guide could be broadcast and audio clips also supplied with short and long descriptions of each program item. Alternatively, signals embedded in the data stream associated with a broadcast could trigger specific audio clips such as "news about to be broadcast" or "next program is the shipping news". The operation of this will be described in more detail below.

The information sent by the broadcaster, e.g. BBC, will contain an "ensemble" of data such as a collection of radio programs, from which the user can select a desired program such as Radio 4 using the control panel 17. The broadcast information will also include other information such as electronic program guides and, for the purpose of this invention, a set of audio clips to be stored by the receiver. Thus, the demodulator 11 separates the broadcast data into live broadcast information to be decoded by decoder 12 and audio clips which are not time-critical. The clips are sent to storage 20 via processor 16. The audio clips may contain clips to be played in response to actions by the user including control of basic functions such as volume, bass, treble, mute which are broadcast independent, and clips related to programs selected such as "Radio 4 selected". Furthermore, as noted above, stored audio clips could be played in response to a trigger from the broadcaster such as "the news follows". This would have the advantage of the broadcaster not having to transmit this data repeatedly.

Obviously the memory 20 will have limited capacity. It is envisaged that it would be a "first in first out memory" so that it only stored audio clips sent from the broadcasters to which the user has most recently tuned in. By use of appropriate file names broadcasters would be able to overwrite previously sent audio clips, for example to replace the voice of one presenter with that of another. Each clip could include a text equivalent to be shown on the display 18.

In one possible refinement of the invention, the broadcaster could send a collection of audio clips including more than one for each function, and the receiver could be equipped to enable the user to choose which is to be used, for example by cycling through the options. Thus the user could choose between alternative voices and/or alternative languages.

In the case where the audio clips can be updated dynamically via the broadcast itself it should be noted that the decoder for the audio clips need not be the same one as that used for the digital radio. It could be a separate decoder dedicated for the task or it could be running in a different part of the system, e.g. in a mobile phone or PDA. It could also be a software decoder running in a host controller.

For example, the audio clips may be broadcast in a format that cannot be decoded by the existing radio decoder. Typically a digital radio has an audio decoder which for DAB is MPEG1 layer 2 or MP2. However some users may wish to send the audio clips in a more advanced format such as MP3 or AAC or some other compression system so that the clips take up less memory. The decoder used for the DAB may not be able to decode such clips. However if the radio was built into a product such as a mobile phone, it might be possible to use the phone's e.g. MP3 decoder to decode an audio clip sent with the digital broadcast The receiver could have an optional "standby" mode for use during the night or at some other time when not playing broadcast data requested by the user, during which the audio clip store could be updated, for example by the radio cycling through all available frequencies or those preferred by the user.

The invention claimed is:

1. A digital audio receiver for receiving digital audio information in the form of live broadcast data transmitted simultaneously with additional audio data clips, the receiver comprising:

means for separating the live broadcast data from the additional audio clips, means for storing the additional audio clips, user operable means for selecting a specific program and controlling other functions of the receiver, audio output means; and control means for controlling the audio output means to reproduce a selected audio program in response to a signal from the user operable means and to reproduce one or more selected audio clips in response to further signals identifying the audio clips, wherein each additional audio clip stored on the means for storing is connected with a specific manually operable function of the receiver and the control means controls the audio output means so as to reproduce each additional audio clip when the corresponding manually operable function is operated manually by the user.

2. A digital audio receiver as claimed in claim 1 in which one or more of the further signals is a broadcast signal supplied to the control means by the separating means.

3. A digital audio receiver as claimed in claim 1 or 2 in which one or more of the further signals is supplied to the control means from the user operable means.

4. A digital audio receiver as claimed in claim 1 in which the clips include audio information identifying broadcast content.

5. A digital audio receiver as claimed in claim 1 in which the clips include clips relating to broadcast-independent functions of the receiver.

6. A digital audio receiver as claimed in claim 1 in which the means for storing the audio clips stores data on a first-in first-out basis.

7. A digital audio receiver as claimed in claim 1 in which the clips have associated identification data to permit them to be overwritten.

8. A receiver as claimed in claim 1 including decoding means in which the audio clips are decoded separately from the remainder of the broadcast audio data.

9. A receiver as claimed in claim 1, wherein some of the additional audio clips is connected with standard functions of the receiver.

10. A receiver as claimed in claim 1, wherein one of the additional audio clips is connected with a volume up/down function.

11. A receiver as claimed in claim 1, wherein each additional audio clip stored on the means for storing is selectively updatable.

* * * * *